United States Patent
Giovanardi et al.

(10) Patent No.: US 12,424,217 B2
(45) Date of Patent: Sep. 23, 2025

(54) DYNAMIC CONVERSATION ALERTS WITHIN A COMMUNICATION SESSION

(71) Applicant: Zoom Communications, Inc., San Jose, CA (US)

(72) Inventors: Davide Giovanardi, San Jose, CA (US); Stephen Muchovej, Bishop, CA (US); Xiaoli Song, Redding, CA (US); Min Xiao-Devins, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 320 days.

(21) Appl. No.: 17/871,970

(22) Filed: Jul. 24, 2022

(65) Prior Publication Data
US 2024/0029727 A1 Jan. 25, 2024

(51) Int. Cl.
*G06F 3/16* (2006.01)
*G10L 15/08* (2006.01)
*G10L 15/16* (2006.01)
*G10L 15/18* (2013.01)
*G10L 15/22* (2006.01)

(52) U.S. Cl.
CPC .............. *G10L 15/22* (2013.01); *G06F 3/167* (2013.01); *G10L 15/16* (2013.01); *G10L 15/1815* (2013.01); *G10L 2015/088* (2013.01)

(58) Field of Classification Search
CPC ................... G10L 15/1815; G10L 2015/088
See application file for complete search history.

(56) References Cited

U.S. PATENT DOCUMENTS 9,160,852 B2 * 10/2015 Ripa .................... H04M 3/5175
11,315,569 B1 * 4/2022 Talieh ................. H04L 12/1831
11,417,097 B2 * 8/2022 Lin ........................ G06V 20/49
(Continued)

FOREIGN PATENT DOCUMENTS

EP          2950307 B1 *  4/2018  ........... G06F 16/951

OTHER PUBLICATIONS

Cantor, Michael N., Henry J. Feldman, and Marc M. Triola. "Using trigger phrases to detect adverse drug reactions in ambulatory care notes." BMJ Quality & Safety 16.2 (2007): 132-134. (Year: 2007).*

*Primary Examiner* — Paras D Shah
*Assistant Examiner* — Oluwadamilola M Ogunbiyi
(74) *Attorney, Agent, or Firm* — Young Basile Hanlon & MacFarlane, P.C.

(57) ABSTRACT

Methods and systems provide for dynamic conversation alerts within a communication session. In one embodiment, the system presents, to a client device associated with a user of a communication platform, a user interface ("UI") including a prompt for the user to submit one or more alert phrases, each alert phrase being associated with a category; receives, from the client device, a list of submitted alert phrases; and receives a transcript of a communication session between participants. For each utterance in the transcript, the system determines whether one or more predictions of relatedness are present between the utterance and one or more alert phrases from the list of submitted alert phrases. The system then transmits, to the client device, a list of related categories, each related category including one or more timestamps of utterances for which a prediction of relatedness is present for an alert phrase associated with that category.

20 Claims, 6 Drawing Sheets

(56) References Cited

U.S. PATENT DOCUMENTS

| | | | | |
|---|---|---|---|---|
| 2013/0060670 | A1* | 3/2013 | Galloway | G06Q 40/02 |
| | | | | 705/35 |
| 2016/0203498 | A1* | 7/2016 | Das | G06Q 50/01 |
| | | | | 705/7.29 |
| 2017/0116341 | A1* | 4/2017 | Wenger | G06F 16/248 |
| 2019/0325243 | A1* | 10/2019 | Sikka | G06V 10/267 |
| 2019/0341050 | A1* | 11/2019 | Diamant | G06V 40/172 |
| 2020/0081525 | A1* | 3/2020 | Peterson | B60K 35/10 |
| 2021/0097239 | A1* | 4/2021 | Arora | G06F 40/30 |
| 2021/0157834 | A1* | 5/2021 | Sivasubramanian | |
| | | | | G06F 16/686 |
| 2021/0256534 | A1* | 8/2021 | An | G06N 3/08 |
| 2021/0406473 | A1* | 12/2021 | Park | H04L 51/02 |
| 2022/0058432 | A1* | 2/2022 | Savvides | G06N 3/042 |
| 2022/0084094 | A1* | 3/2022 | Tuchler | G06Q 30/0643 |
| 2022/0254348 | A1* | 8/2022 | Tay | G06F 16/345 |
| 2022/0343914 | A1* | 10/2022 | Bonser | G10L 15/02 |
| 2022/0414467 | A1* | 12/2022 | Ngo | G06F 40/40 |
| 2023/0115212 | A1* | 4/2023 | Salamon | G10H 1/0008 |
| | | | | 84/602 |
| 2023/0260519 | A1* | 8/2023 | Medalion | G10L 17/00 |
| | | | | 704/232 |
| 2023/0419695 | A1* | 12/2023 | Akers | G06N 3/045 |

* cited by examiner

| risk category | definition | example sentences | speaker |
|---|---|---|---|
| budget | statements indicating too high of a price/etc | • this seems too expensive<br>• that will break the budget<br>• my budget won't allow<br>• I will need to get approval for this cost<br>• I need approval for that budget<br>• I would be over-budget.<br>• I don't think we could afford that<br>• I'd need to think about this as it might be over my budget | customer |
| timeline | mentions of deliverable and time | • this is falling behind schedule<br>• the delivery is slipping<br>• my schedule is slipping<br>• will you be able to deliver it on time?<br>• I have a long backlog of tasks<br>• How could we speed this up?<br>• What's taking so long?<br>• We're not going to make our deadline<br>• How fast can you make this delivery? | customer AND rep |

DYNAMIC CONVERSATION ALERTS WITHIN A COMMUNICATION SESSION

FIELD OF INVENTION

The present invention relates generally to digital communication, and more particularly, to systems and methods for providing dynamic conversation alerts within a communication session.

SUMMARY

The appended claims may serve as a summary of this application.

BRIEF DESCRIPTION OF THE DRAWINGS

The present invention relates generally to digital communication, and more particularly, to systems and methods for providing dynamic conversation alerts within a communication session.

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, there is currently no way when reviewing such meetings to return "indicators" or "alerts" triggered in an uttered sentence, in specific categories such as, for example, "budget" or "intent to buy". There is also currently no way to allow a user, such as a sales associate or sales team, to define alert phrases and/or categories to indicate when they would like to be alerted of those phrases or similar phrases. Users may also desire to have certain alert actions triggered automatically upon such alerts being received, but there is no way for this to occur within remote meetings either.

Thus, there is a need in the field of digital communication tools and platforms to create a new and useful system and method for providing dynamic conversation alerts within a communication session. The source of the problem, as discovered by the inventors, is a lack of ability for the system to highlight sentences which trigger alerts, aggregate alert categories, and/or perform alert actions.

In one embodiment, the system presents, to a client device associated with a user of a communication platform, a user interface ("UI") including a prompt for the user to submit one or more alert phrases, each alert phrase being associated with a category; receives, from the client device, a list of submitted alert phrases; and receives a transcript of a communication session between participants, one of the participants being the user, the transcript including timestamps for a number of utterances associated with speaking participants. For each utterance in the transcript, the system determines whether one or more predictions of relatedness are present between the utterance and one or more alert phrases from the list of submitted alert phrases. The system then transmits, to the client device, a list of related categories, each related category including one or more timestamps of utterances for which a prediction of relatedness is present for an alert phrase associated with that category. Further areas of applicability of the present disclosure will become apparent from the remainder of the detailed description, the claims, and the drawings. The detailed description and specific examples are intended for illustration only and are not intended to limit the scope of the disclosure.

Figure 1A:
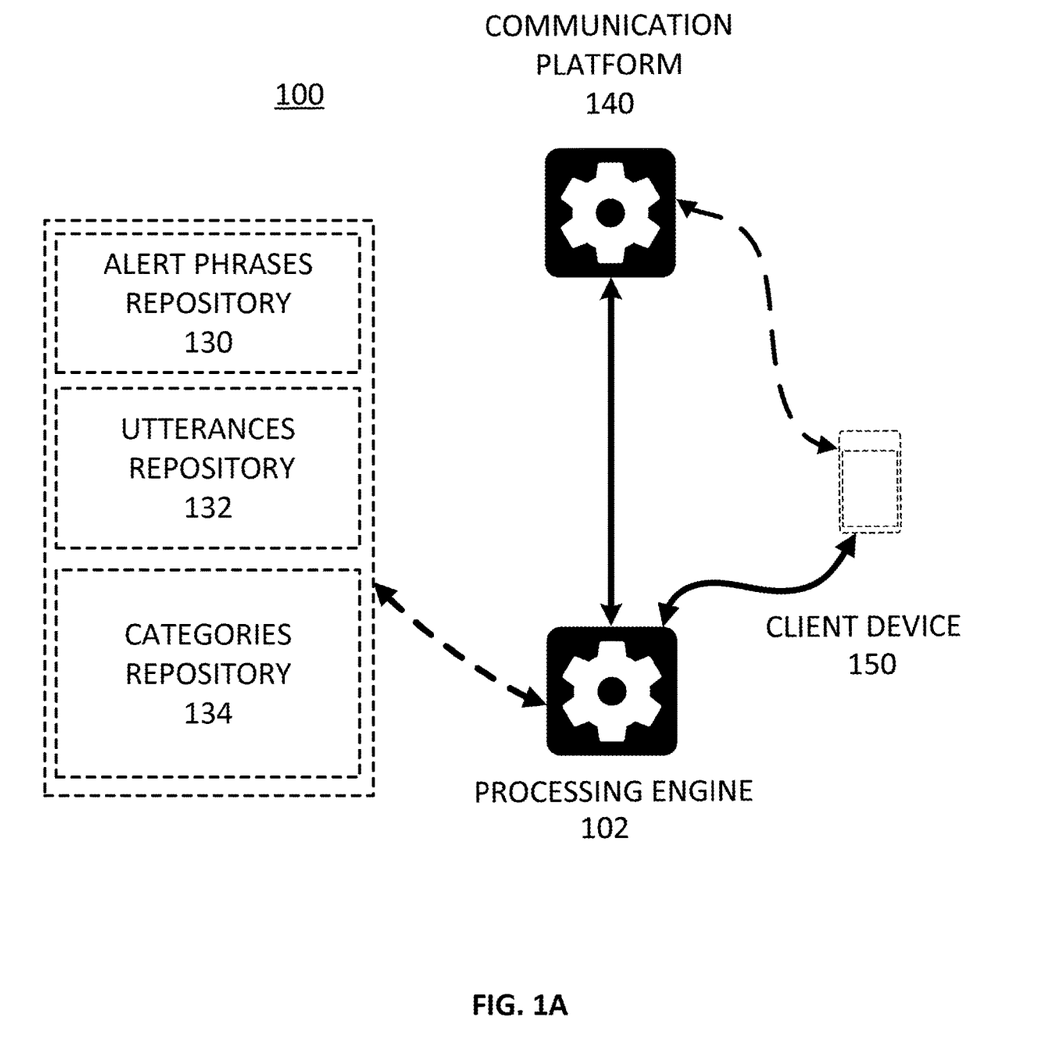
FIG. 1A is a diagram illustrating an exemplary environment in which some embodiments may operate.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an alert phrases repository 130, utterances repository 132, and/or categories repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
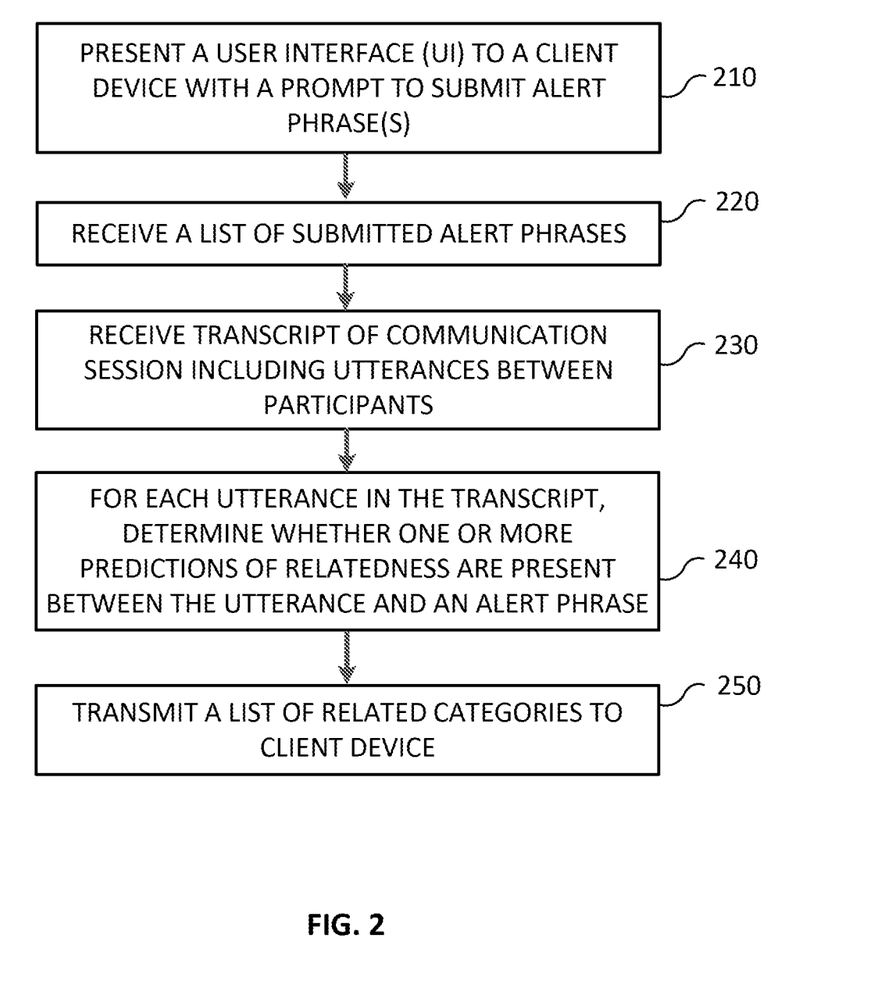
FIG. 2 is a flow chart illustrating an exemplary method that may be performed in some embodiments.

In an embodiment, the processing engine 102 may perform the exemplary method of FIG. 2 or other method herein and, as a result, provide dynamic conversation alerts within a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an alert phrases repository 130, utterances repository 132, and/or categories repository 134. The optional repositories function to store and/or maintain, respectively, submitted alert phrases for the communication session; utterances spoken by participants retrieved from the transcript; and categories which may be associated with alert phrases. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
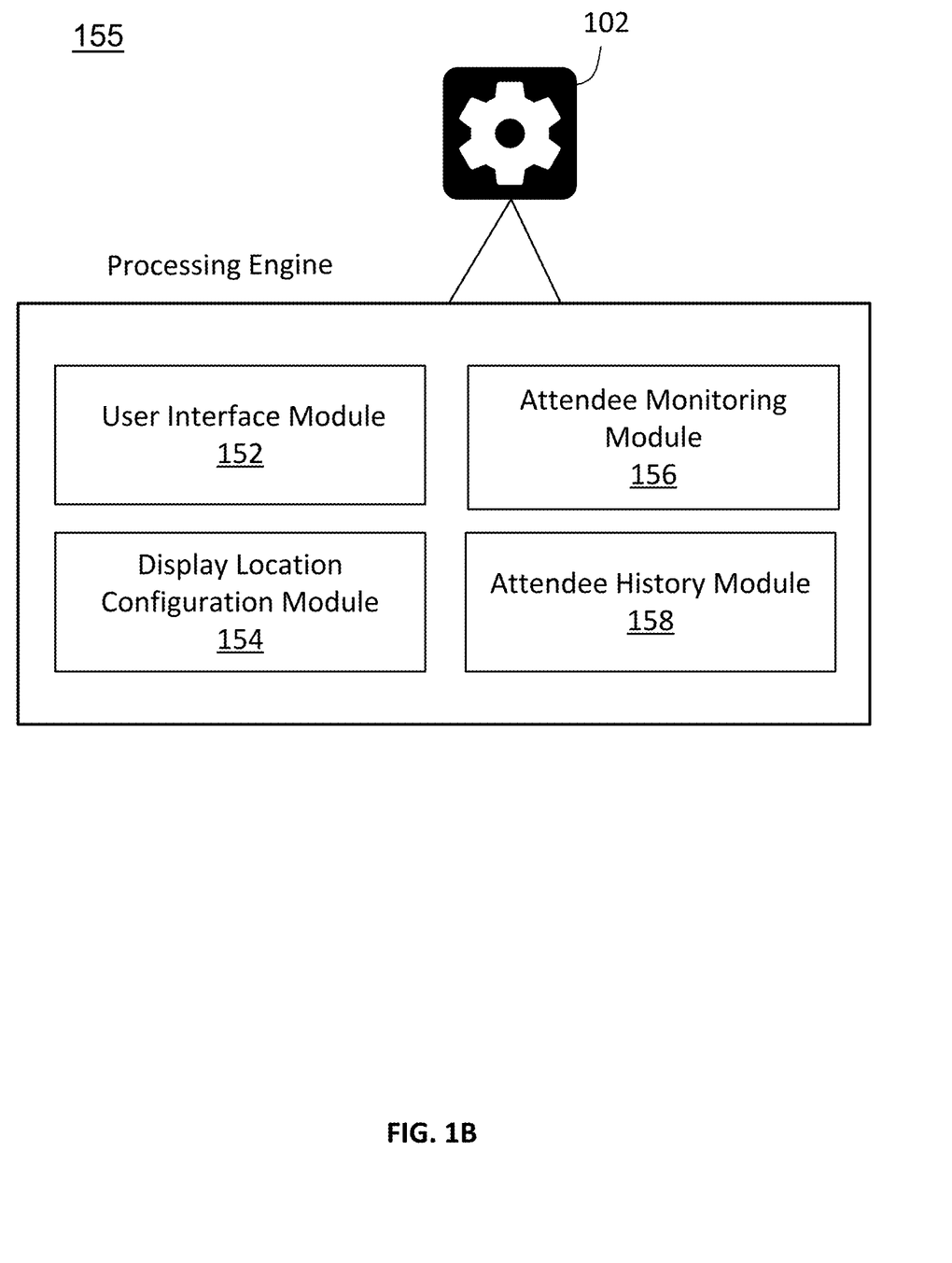
FIG. 1B is a diagram illustrating an exemplary computer system that may execute instructions to perform some of the methods herein.

FIG. 1B is a diagram illustrating an exemplary computer system 155 with software modules that may execute some of the functionality described herein. In some embodiments, the modules illustrated are components of the processing engine 102.

User interface module 152 functions to present, to a client device associated with a user of a communication platform, a user interface ("UP") including a prompt for the user to submit one or more alert phrases, each alert phrase being associated with a category.

Alert phrases module 154 functions to receive, from the client device, a list of submitted alert phrases.

Transcript module 156 functions to receive a transcript of a communication session between participants, one of the participants being the user, the transcript including timestamps for a number of utterances associated with speaking participants.

Relatedness module 158 functions to determine, for each utterance in the transcript, whether one or more predictions of relatedness are present between the utterance and an alert phrase from the list of submitted alert phrases.

Transmitting module 160 functions to transmit, to the client device, a list of related categories, each related category including one or more timestamps of utterances for which a prediction of relatedness is present for an alert phrase associated with that category.

The above modules and their functions will be described in further detail in relation to an exemplary method below.

FIG. 2A is a flow chart illustrating an exemplary method that may be performed in some embodiments.

At step 210, the system presents, to a client device associated with a user of a communication platform, a UI, with the UI including a prompt for the user to submit one or more alert phrases.

In some embodiments, the system presents a UI associated with a particular communication session that the client device is currently connected to. In other embodiments, the system presents a UI associated with a particular communication session that has been previously conducted and has been terminated or completed. With respect to a communication session, either being conducted currently or completed, the client device has connected to the session with one or more other participants to the communication session. The communication session may represent, for example, an instance of a video conference, webinar, informal chat session, or any other suitable session which has been initiated and hosted via the video communication platform for the purpose of remotely communicating with one or more users of the video communication platform, i.e., the participants within the communication session. Participants are connected to the session via user devices, and are associated with user accounts within the communication platform.

In some embodiments, the participants are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., send messages back and forth between) one another in real time.

In some embodiments, the UI may present one or more screens or windows relating to settings, preferences, or other configuration aspects of the communication session. For example, a user may have been presented with a UI which enables playback of a recorded video of a past communication session. The user may navigate within that UI to a settings of preferences section of the UI which displays a prompt to enter one or more alert phrases within selectable text fields.

Alert phrases, as used herein, represent sample sentences which a user may wish to be brought to their attention when appearing within a communication session they are reviewing or playing back, or, in some embodiments, appearing within a current communication session that is underway. In some embodiments, such sentences may be "utterances", i.e., sentences which are spoken during the course of a particular communication session, often uttered from one participant to one or more other participants within the session. Generally, alert phrases are phrases which the user wishes to have brought to their attention. In various embodiments, any phrase, constituting, e.g., one or more numbers, letters, and/or symbols may be submitted by the user. In other embodiments, the user may be restricted only to certain characters. An alert phrase may be, in various embodiments, a complete sentence, a partial or incomplete sentence, a run-on sentence, several sentences, or any other combination of words. In various embodiments, an alert phrase may end with, e.g., a period, question mark, exclamation mark, or any other suitable punctuation.

In some embodiments, each alert phrase is associated with a category. A category may also be referred to as, e.g., a "risk category", "alert category", "indicator category", or similar. A category as used herein represents a particular type of alert phrase, such that potentially several alert phrases can be classified as belonging to that particular category. Examples of categories may include, e.g., "budget", "timeline", "confusion", "legal" (which may include or be separate from categories such as "compliance" or "regulatory"), "obstacles", "customer needs", "responsiveness", "dread", and "intent to buy". In some embodiments, one or more categories may relate to areas of interest, such as, e.g., positive comments, problem areas, criticisms, obstacles, concerns, inquiries, or compliments that a prospective customer or client, current customer or client, or other receiving party may have, while other categories may relate to ambivalence, enthusiasm, or any other suitable reaction. Still other categories may relate to questions the customer would like answered, such as questions related to the timeline for delivering a product. Many categories representing different intentions, reactions, or expressions may be contemplated.

In some embodiments, a user does not create nor define new categories. Rather, the user selects, from a list of categories, a particular category to be associated with a particular alert phrase the user has entered into the UI. In some embodiments, the user selects the category from a drop-down menu that is populated with a list of pre-existing categories. Such categories may represent common categories which users may expect to group alert phrases within. In some embodiments, the list of available categories may be determined based on the type of meeting associated with the communication session. For example, certain categories may appear for a sales team conducting a sales meeting with a prospective customer, while different categories may appear for a customer service representative attempting to address a technical issue of a current customer.

In some embodiments, a user may have the option to create and/or define new categories, rather than being limited only to selecting from a list of existing categories.

At step 220, the system receives, from the client device, a list of submitted alert phrases. The user submits the alert phrases via the UI described above with respect to step 210. Upon the user submitting the alert phrases via the UI, the system transmits the alert phrases to the system, which retrieves the alert phrases. In some embodiments, the user also selects a category to be associated with each alert phrases. As described above, in some embodiments, the user selects a category from a list of existing categories, while in other embodiments, the system additionally or alternatively associated each alert phrase with a newly created category defined by the user. An example list of alert phrases and their associated categories is illustrated in FIG. 3, described in further detail below.

Figure 3:
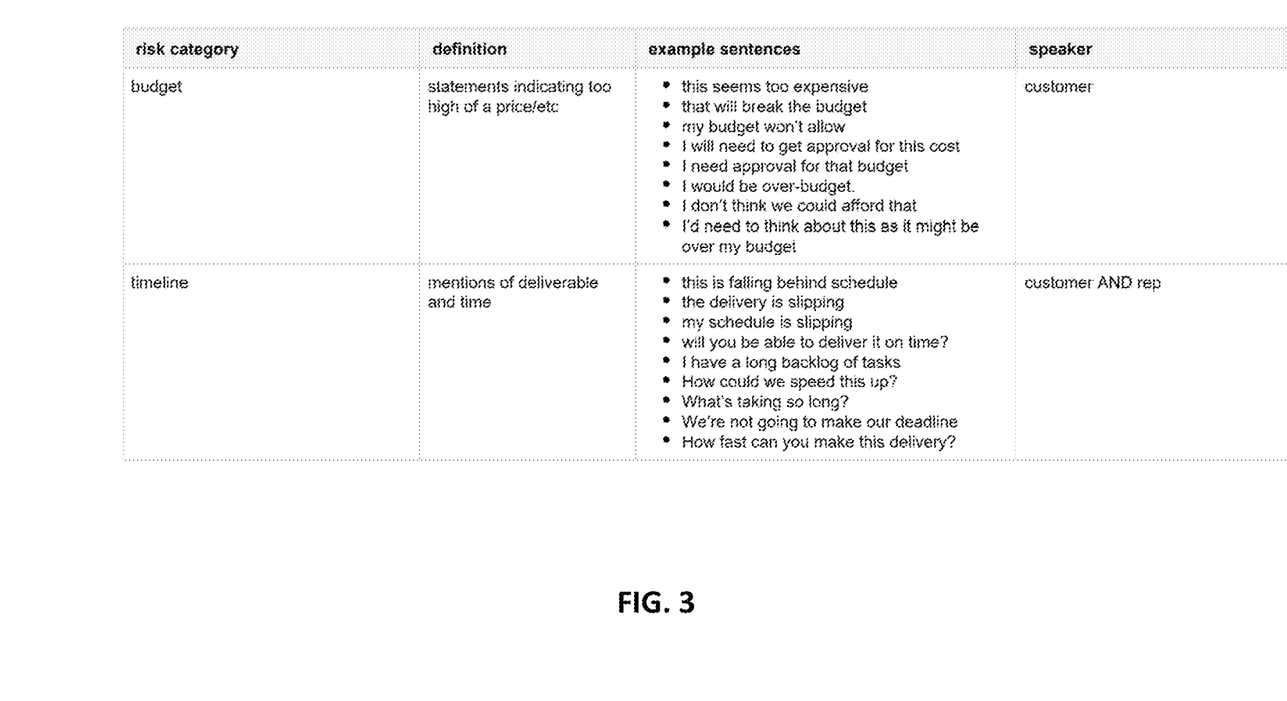
FIG. 3 is a diagram illustrating examples of submitted alert phrases and their associated categories.

FIG. 3 is a diagram illustrating examples of submitted alert phrases and their associated categories. Within the diagram, each category (or "risk category" within the example) has a definition which describes the category, a number of alert phrases (or "example sentences" within the example), and a speaker who would utter the sentence in order for the alert in question to be triggered.

In some embodiments, a user has submitted the alert phrases shown within a presented UI, as described in steps 210 and 220 above. Alert phrases shown include "this seems too expensive", "that will break the budget", "my budget won't allow", and "I will need to get approval for this cost", which are all associated with the category "budget". The "budget" category is given the associated definition, "statements indicating too high of a price/etc". The intended speaker for these alert phrases is indicated to be "customer", i.e., the prospective customer within the sales meeting that the user is conducting.

Returning to FIG. 2, at step 230, the system receives a transcript of a communication session between participants, one of the participants being the user, the transcript including timestamps for a number of utterances associated with speaking participants.

The transcript the system receives relates to a conversation between the participants that is produced during the communication session. That is, the conversation which was produced during the communication is used to generate a transcript. In various embodiments, the transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript is generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

At step 240, the system determines, for each utterance in the transcript, whether one or more predictions of relatedness are present between the utterance and an alert phrase from the list of submitted alert phrases.

In some embodiments, an intent detection algorithm is employed to determine whether one or more predictions of relatedness are present between the utterance and one or more alert phrases from the list of submitted alert phrases. In some embodiments, the intent detection algorithm functions by identifying utterances in the transcript which indicate one or more areas of interest that should be brought to the attention of the user. In some embodiments, the identity detection algorithm is an AI algorithm, such as, e.g., a deep learning, meta-learning, or other AI algorithm which makes use of neural networks. In some embodiments, the intent detection algorithm performs the determination of predictions of relatedness without any pre-training, i.e., without making use of training data. In such cases, the algorithm uses the submitted alert phrases as inputs representing particular sentence structures which indicate an area of interest within the deal, sorted into the submitted categories associated with the alert phrases.

In some embodiments, the intent detection algorithm makes use of prototypical neural networks ("ProtoNets") in order to perform intention detection tasks in low data regimes where there may be limited or no pre-training or training data used.

In such cases, the algorithm functions based on the idea that there exists an embedding space in which points cluster around a single prototype representation for each class. The algorithm then learns a non-linear mapping that projects input sentences into that embedding space, using a neural network. The algorithm takes the class's prototype to be the means of its support set in the embedding space.

In some embodiments, few-shot intent detection techniques are employed, where few-shot prototypes are computed as the mean of embedded support examples for each class. In other embodiments, zero-shot intent detection techniques are employed, where zero-shot prototypes are produced by embedding class meta-data. In either case, embedded query points are classified via a softmax over distances to class prototypes.

In some embodiments, pre-trained language models, such as, e.g., pre-training sentence embedding language models, are employed. For example, in various embodiments, the algorithm may employ one or more open source language model libraries for sentence transformer models, such as, for example, RoBERTa, BERT, all-mpnet-base-v2, or all-MiniLM-L6-v2. In some embodiments, this training functions to allow the encoder to learn to project sentences or phrases into a meaningful latent space, i.e., a space where the algorithm can perform distance computations and assign a query to its prototype.

In some embodiments, such models are trained within a meta-learning framework. In such cases, the meta-learning framework allows the model to generalize well to new classes at test time. Within such a meta-learning framework, the model is presented with a brand new task with unseen inputs and unseen classes that the model has never been exposed to during training. This differs from traditional ML where at test time there are unseen inputs, but the ML model is asked to predict the same classes. In this case, the model is asked to learn to predict new classes given new inputs, and thus is forced to generalize to unseen data, which is important to few-shot settings in particular where the model needs to quickly adjust to new data and classes.

In some embodiments, matching networks are employed to provide a way to assign a class label to a query, where the encoder learns to project sentences or phrases into the learned embedding space and then outputs the class that is closer in distance to the embedded queries. In some embodiments, whenever a number of example phrases is greater than 1, the algorithm aggregates those phrases into so-called prototypes, and assigns the class based on the closest prototype. In some embodiments, once those prototypes are derived in embedding space, class assignment is made based on distance metrics. In some embodiments, the distance criteria may be a calculation of Euclidean distance, while in other embodiments, the distance criteria may be a calculation of cosine similarity.

In some embodiments, the algorithm functions to classify utterances from the transcript not just within existing categories, but also to potentially classify utterances as not related to any of the existing categories. In this way, "out of scope" classifications may exist for utterances which the algorithm deems do not fit into any existing category.

Figure 4:
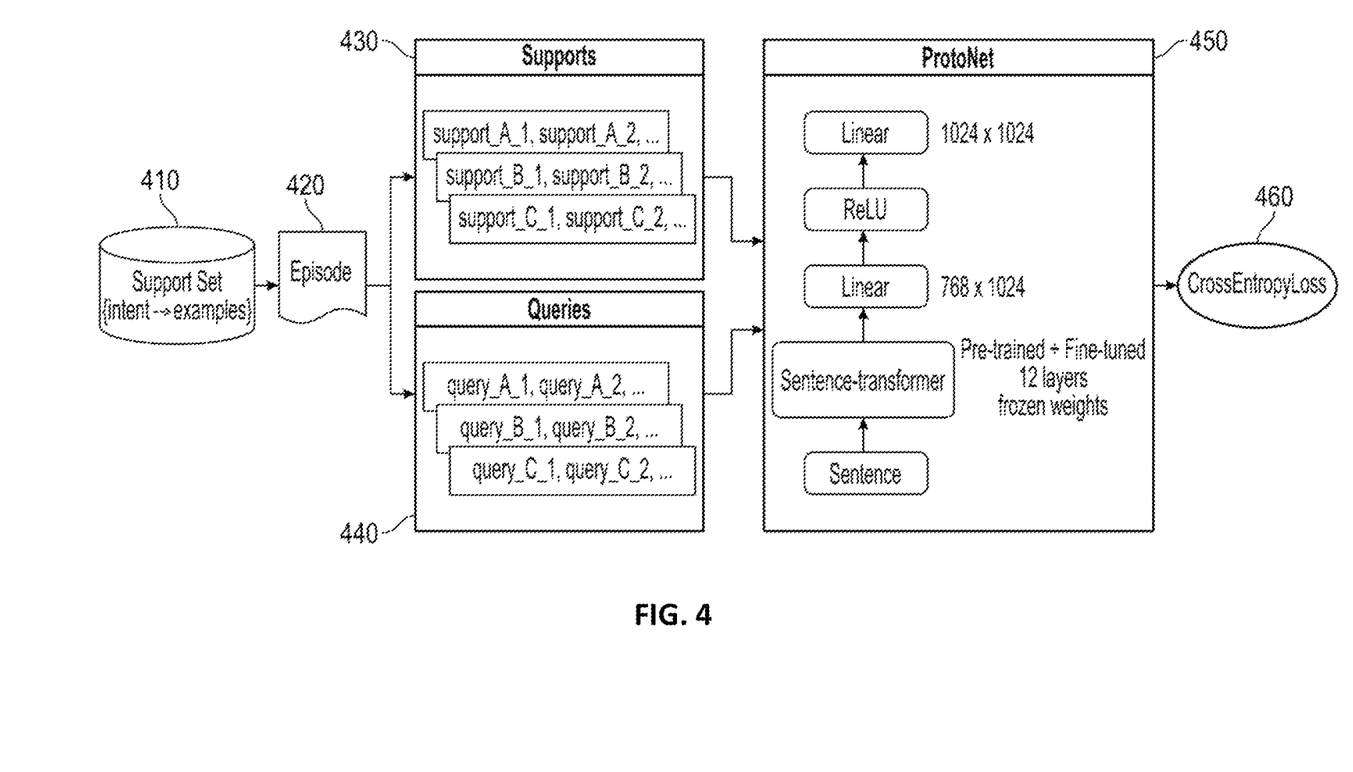
FIG. 4 is a diagram illustrating one exemplary method for an intent detection algorithm to operate to determine whether predictions of relatedness exist between utterances in a transcript and alert phrases from a list of submitted alert phrases.

FIG. 4 is a diagram illustrating one exemplary method for an intent detection algorithm to operate to determine whether predictions of relatedness exist between utterances in a transcript and alert phrases from a list of submitted alert phrases.

On the far left of the diagram, a support set 410 is retrieved. The support set 410 acts as a mapping between intents and examples, e.g., alert phrases and/or the categories they fall within. In some embodiments, the examples are provided by the user in the form of submitted alert phrases and categories, as described above. From this support set, one or more episodes 420 is generated. The data from the support set 410 is organized into an episodic data loader. In some embodiments, this organization is the result of a meta-learning framework, as described above. The episode 420 includes one or more supports 430 and one or more queries 440. Supports represent sentences, phrases, or examples that are used to create anchors, i.e., alerts or indicators to be used for classification. Supports 430 can function as representatives for different classes, i.e. categories, to be used. For example, Support_A may be a category of "budget" or "intent to buy", and there may be multiple such classes (A, B, C, etc.) that are sought to be classified. Queries 440 represent an evaluation set which matches a particular class. Examples of queries within the support of "budget" may be "I'm running out of budget" or "this will break the budget". In some embodiments, categories as described above may be considered supports, and alert phrases as described above may be considered queries.

The prototypical neural network, or ProtoNet 450 functions to generate class prototypes based on the supports and queries. The ProtoNet assigns a given query to the right support. In some embodiments, for each of the supports and query sentences or phrases, the algorithm passes the query through a sentence transformer. In some embodiments, the sentence transformer makes use of the pre-trained weights of a particular language model. In some embodiments, fine-tuning is performed on these pre-trained weights to improve the functioning and results of the sentence transformer. In some embodiments, the sentence transformer has multiple layers, as in this case 12 layers are present. In some embodiments, these multiple layers are fine-tuned and/or initialized from scratch. In some embodiments, the sentence transformer makes use of frozen weights. In some embodiments, the sentence transformed is further pre-trained on general domain data, or on domain data that may be specific to the user or other users similar to the user, in order to encode the sentences better for more accurate results for the user.

In the example here, a 2-layer feed forward network is employed, where a linear mapping is performed where the dimensions of the embedding are 768×1024, a rectified linear unit ("ReLU") is employed, and then another linear mapping is performed where the dimensions of the embedding is 1024×1024. This results in a non-linear mapping to another embedding space, where the algorithm can perform prototype matching. The algorithm attempts to assign the query to the closest prototype, such as by calculating cosine similarity or Euclidean distance.

On the far right of the diagram, cross entropy loss 460 is computed, then back propagation occurs. This is performed to improve this embedding space and to assign queries in a correct manner.

While ML models and intent detection models have been discussed in detail above, many other such forms of predicting relatedness between utterances and alert phrases may be contemplated.

Returning to FIG. 2, at step 250, the system transmits, to the client device, a list of related categories, each related category including one or more timestamps of utterances for which a prediction of relatedness is present for an alert phrase associated with that category. In some embodiments, prior to transmitting the list of the related categories to the client devices, the system formats the list of related categories into a structured data markup format, such as, e.g., JSON format. In some embodiments, the system additionally transmits the text of the utterances themselves. In some embodiments, the related alert phrases are visually highlighted or otherwise visually indicated within the utterances. In some embodiments, the system transmits, for each category from the list of related categories, the category name, and timestamp locations of all of the areas within the transcript that were identified as relating to that category.

In some embodiments, the system transmits this data in real-time while the communication session is still in progress. In such cases, the user may pre-populate submitted alert phrases that they are interested in, along with pre-populated actions that the user may expect to occur upon a prediction of relatedness being determined. The system would then use one or more of the above-mentioned algorithms to identify whether a particular utterance in the transcript is related to any of the submitted alert phrases. For example, in one scenario, a salesperson is talking to a customer during a communication session. Upon the customer saying, "this is too expensive", an alert appears within the UI of the salesperson contains information on the customer's available pricing options. The salesperson may then inform the customer about these pricing options. In some embodiments, one or more chat bots may be employed to make use of such a real-time alert feature, using pre-populated queries or submitted alert phrases which are associated with pre-populated categories. The methods described herein can then fit into a conversation flow and/or one or more recommendations provided by the chat bot, in real time during a communication session.

In various embodiments, the client device may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client device to receive a UI presenting data on related categories and related alert phrases if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

In some embodiments, within this displayed UI presented to the client device, data corresponding to the related categories, related utterances, and/or related alert phrases can be displayed. For example, a UI may be shown which displays aggregate analytics data pertaining to a sales team's meetings with clients over multiple conversations and communication sessions. An example of such a UI displayed to client device(s) is illustrated in FIG. 4 and described in further detail below. In some embodiments, rather than aggregate analytics data or data shown for all team members, individual and/or customized analytics data for a particular participant can be viewed, including potentially a wide variety of data for that particular individual.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, with various related alert phrases highlighted or otherwise indicated within the utterances of the transcript. In some embodiments, users may instruct the UI to display the related utterances, related alert phrases, and/or related categories when viewing the transcript.

Figure 5:
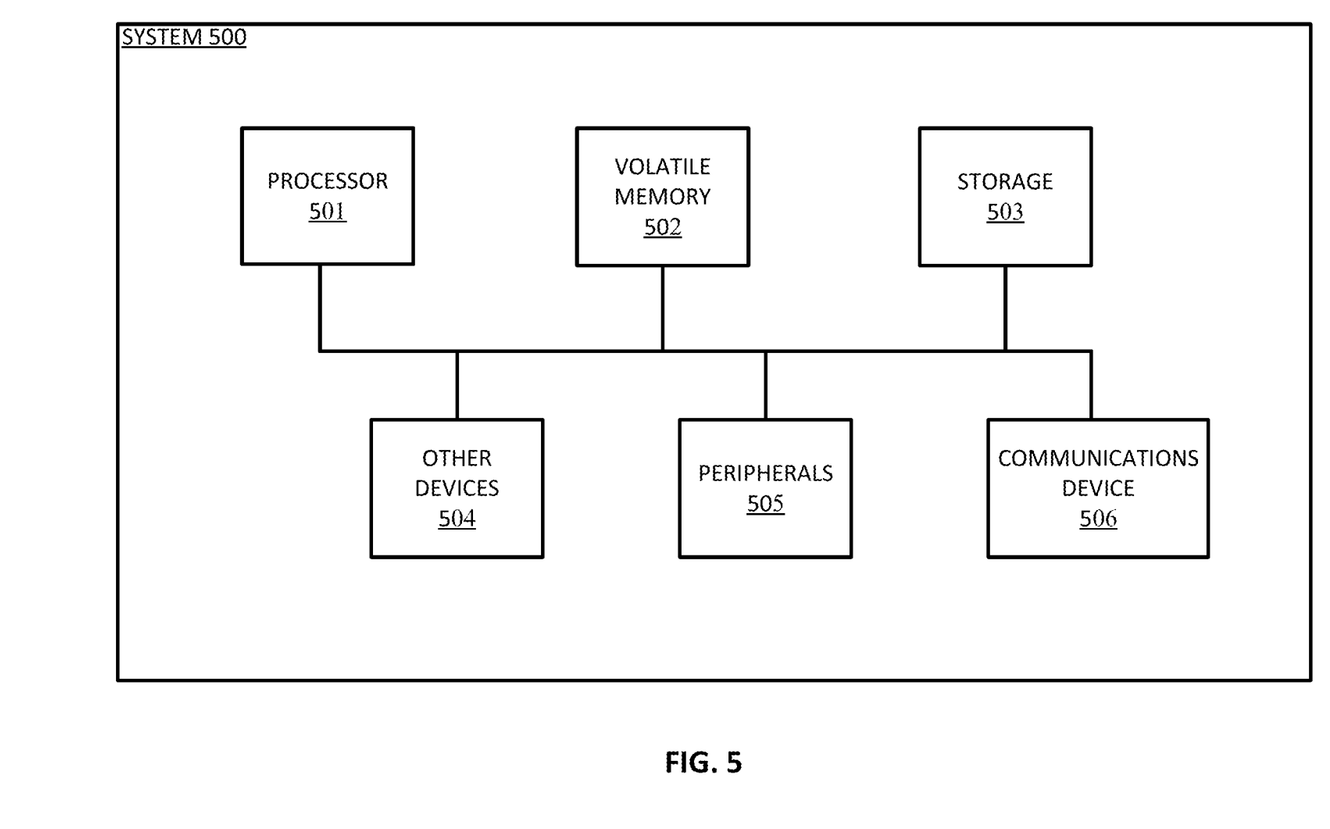
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method, comprising: presenting, to a client device associated with a user of a communication platform, a user interface (UI) comprising a prompt for the user to submit one or more alert phrases, each alert phrase being associated with a category; receiving, from the client device, a list of submitted alert phrases; receiving a transcript of a communication session between a plurality of participants, one of the participants being the user, the transcript comprising timestamps for a plurality of utterances associated with speaking participants; for each utterance in the transcript, determining whether one or more predictions of relatedness are present between the utterance and one or more alert phrases from the list of submitted alert phrases; and transmitting, to the client device, a list of related categories, each related category comprising one or more timestamps of utterances for which a prediction of relatedness is present for an alert phrase associated with that category.

Example 2. The method of example 1, further comprising: for each alert phrase for which a prediction of relatedness is determined to be present, determining a category associated with the alert phrase.

Example 3. The method of any of examples 1-2, wherein the UI further comprises a prompt for the user to submit, for each of the submitted alert phrases, a category to be associated with the alert phrase.

Example 4. The method of example 3, wherein the submitted category is selected by the user from a list of prespecified categories.

Example 5. The method of example 3, wherein the submitted category is created by the user.

Example 6. The method of any of examples 1-5, wherein the UI further comprises a prompt for the user to define at least one of the categories associated with the alert phrases.

Example 7. The method of any of examples 1-6, wherein determining whether the predictions of relatedness are present further comprises determining whether one or more predictions of relatedness are present between the utterance and one or more variations on alert phrases from the list of submitted alert phrases.

Example 8. The method of any of examples 1-7, wherein determining whether the predictions of relatedness are present is performed at least in part by one or more sentence embedding models.

Example 9. The method of any of examples 1-8, wherein the list of related categories with timestamps of utterances is transmitted in real-time while the user is connected to the communication session.

Example 10. The method of any of examples 1-9, further comprising: generating, based on the submitted alert phrases, one or more additional alert phrases to be added to the list of submitted alert phrases, each of the additional alert phrases being associated with a category.

Example 11. The method of example 10, further comprising: segmenting each of the categories into one or more of: a positive speaker intent, a negative speaker intent, and a neutral speaker intent, wherein each of the additional alert phrases is generated based further on the segment for a category.

Example 12. The method of any of examples 1-11, further comprising: detecting that one of the alert phrases has been associated with a category that differs in intent from the alert phrase; and associating the alert phrase with a different category.

Example 13. The method of any of examples 1-12, further comprising: detecting that one of the submitted alert phrases at least partially matches an existing alert phrase; executing a target action in response to the detection, the target action comprising one or more of: removing the alert phrase from the list of submitted phrases, prompting the user to submit a different alert phrase, and replacing the submitted alert phrase with a generated alert phrase.

Example 14. The method of any of examples 1-13, wherein determining whether the predictions of relatedness are present is performed at least in part by one or more intent detection algorithms.

Example 15. The method of any of examples 1-14, wherein determining whether the predictions of relatedness are present is performed at least in part using one or more of: few-shot detection techniques, and zero-shot detection techniques.

Example 16. The method of any of examples 1-15, wherein determining whether the predictions of relatedness are present is performed at least in part by a meta-learning framework.

Example 17. The method of any of examples 1-16, wherein determining whether the predictions of relatedness are present is performed at least in part via a prototypical neural network ("ProtoNet").

Example 18. The method of any of examples 1-17, wherein determining whether the predictions of relatedness are present is performed at least in part by one or more pre-trained language learning models.

Example 19. A communication system comprising one or more processors configured to perform the operations of: presenting, to a client device associated with a user of a communication platform, a user interface (UI) comprising a prompt for the user to submit one or more alert phrases, each alert phrase being associated with a category; receiving, from the client device, a list of submitted alert phrases; receiving a transcript of a communication session between a plurality of participants, one of the participants being the user, the transcript comprising timestamps for a plurality of utterances associated with speaking participants; for each utterance in the transcript, determining whether one or more predictions of relatedness are present between the utterance and one or more alert phrases from the list of submitted alert phrases; and transmitting, to the client device, a list of related categories, each related category comprising one or more timestamps of utterances for which a prediction of relatedness is present for an alert phrase associated with that category.

Example 20. The communication system of example 19, wherein the one or more processors are further configured to perform the operation of: for each alert phrase for which a prediction of relatedness is determined to be present, determining a category associated with the alert phrase.

Example 21. The communication system of any of examples 19-20, wherein the UI further comprises a prompt for the user to submit, for each of the submitted alert phrases, a category to be associated with the alert phrase.

Example 22. The communication system of example 21, wherein the submitted category is selected by the user from a list of prespecified categories.

Example 23. The communication system of example 21, wherein the submitted category is created by the user.

Example 24. The communication system of any of examples 19-23, wherein the UI further comprises a prompt for the user to define at least one of the categories associated with the alert phrases.

Example 25. The communication system of any of examples 19-24, wherein determining whether the predictions of relatedness are present further comprises determining whether one or more predictions of relatedness are present between the utterance and one or more variations on alert phrases from the list of submitted alert phrases.

Example 26. The communication system of any of examples 19-25, wherein determining whether the predictions of relatedness are present is performed at least in part by one or more sentence embedding models.

Example 27. The communication system of any of examples 19-26, wherein the list of related categories with timestamps of utterances is transmitted in real-time while the user is connected to the communication session.

Example 28. The communication system of any of examples 19-27, wherein the one or more processors are further configured to perform the operations of: generating, based on the submitted alert phrases, one or more additional alert phrases to be added to the list of submitted alert phrases, each of the additional alert phrases being associated with a category.

Example 29. The communication system of example 28, wherein the one or more processors are further configured to perform the operations of: segmenting each of the categories into one or more of: a positive speaker intent, a negative speaker intent, and a neutral speaker intent, wherein each of the additional alert phrases is generated based further on the segment for a category.

Example 30. The communication system of any of examples 19-29, wherein the one or more processors are further configured to perform the operations of: detecting that one of the alert phrases has been associated with a category that differs in intent from the alert phrase; and associating the alert phrase with a different category.

Example 31. The communication system of any of examples 19-30, wherein the one or more processors are further configured to perform the operation of: detecting that one of the submitted alert phrases at least partially matches an existing alert phrase;

Example 32. The communication system of any of examples 19-31, wherein determining whether the predictions of relatedness are present is performed at least in part by one or more intent detection algorithms.

Example 33. The communication system of any of examples 19-32, wherein determining whether the predictions of relatedness are present is performed at least in part using one or more of: few-shot detection techniques, and zero-shot detection techniques.

Example 34. The communication system of any of examples 19-33, wherein determining whether the predictions of relatedness are present is performed at least in part by a meta-learning framework.

Example 35. The communication system of any of examples 19-34, wherein determining whether the predictions of relatedness are present is performed at least in part via a prototypical neural network ("ProtoNet").

Example 36. The communication system of any of examples 19-35, wherein determining whether the predictions of relatedness are present is performed at least in part by one or more pre-trained language learning models.

Example 37. A non-transitory computer-readable medium comprising: instructions for presenting, to a client device associated with a user of a communication platform, a user interface (UI) comprising a prompt for the user to submit one or more alert phrases, each alert phrase being associated with a category; instructions for receiving, from the client device, a list of submitted alert phrases; instructions for receiving a transcript of a communication session between a plurality of participants, one of the participants being the user, the transcript comprising timestamps for a plurality of utterances associated with speaking participants; for each utterance in the transcript, instructions for determining whether one or more predictions of relatedness are present between the utterance and one or more alert phrases from the list of submitted alert phrases; and instructions for transmitting, to the client device, a list of related categories, each related category comprising one or more timestamps of utterances for which a prediction of relatedness is present for an alert phrase associated with that category.

Example 38. The non-transitory computer-readable medium of example 37, further comprising: for each alert phrase for which a prediction of relatedness is determined to be present, determining a category associated with the alert phrase.

Example 39. The non-transitory computer-readable medium of any of examples 37-38, wherein the UI further comprises a prompt for the user to submit, for each of the submitted alert phrases, a category to be associated with the alert phrase.

Example 40. The non-transitory computer-readable medium of any of examples 37-39, wherein the submitted category is selected by the user from a list of prespecified categories.

Example 41. The non-transitory computer-readable medium of example 40, wherein the submitted category is created by the user.

Example 42. The non-transitory computer-readable medium of any of examples 37-41, wherein the UI further comprises a prompt for the user to define at least one of the categories associated with the alert phrases.

Example 43. The non-transitory computer-readable medium of any of examples 37-42, wherein determining whether the predictions of relatedness are present further comprises determining whether one or more predictions of relatedness are present between the utterance and one or more variations on alert phrases from the list of submitted alert phrases.

Example 44. The non-transitory computer-readable medium of any of examples 37-43, wherein determining whether the predictions of relatedness are present is performed at least in part by one or more sentence embedding models.

Example 45. The non-transitory computer-readable medium of any of examples 37-44, wherein the list of related categories with timestamps of utterances is transmitted in real-time while the user is connected to the communication session.

Example 46. The non-transitory computer-readable medium of any of examples 37-45, further comprising: generating, based on the submitted alert phrases, one or more additional alert phrases to be added to the list of submitted alert phrases, each of the additional alert phrases being associated with a category.

Example 47. The non-transitory computer-readable medium of example 46, further comprising: segmenting each of the categories into one or more of: a positive speaker intent, a negative speaker intent, and a neutral speaker intent, wherein each of the additional alert phrases is generated based further on the segment for a category.

Example 48. The non-transitory computer-readable medium of any of examples 37-47, further comprising: detecting that one of the alert phrases has been associated with a category that differs in intent from the alert phrase; and associating the alert phrase with a different category.

Example 49. The non-transitory computer-readable medium of any of examples 37-48, further comprising: detecting that one of the submitted alert phrases at least partially matches an existing alert phrase; executing a target action in response to the detection, the target action comprising one or more of: removing the alert phrase from the list of submitted phrases, prompting the user to submit a different alert phrase, and replacing the submitted alert phrase with a generated alert phrase.

Example 50. The non-transitory computer-readable medium of any of examples 37-49, wherein determining whether the predictions of relatedness are present is performed at least in part by one or more intent detection algorithms.

Example 51. The non-transitory computer-readable medium of any of examples 37-50, wherein determining whether the predictions of relatedness are present is performed at least in part using one or more of: few-shot detection techniques, and zero-shot detection techniques.

Example 52. The non-transitory computer-readable medium of any of examples 37-51, wherein determining whether the predictions of relatedness are present is performed at least in part by a meta-learning framework.

Example 53. The non-transitory computer-readable medium of any of examples 37-52, wherein determining whether the predictions of relatedness are present is performed at least in part via a prototypical neural network ("ProtoNet").

Example 54. The non-transitory computer-readable medium of any of examples 37-53, wherein determining whether the predictions of relatedness are present is performed at least in part by one or more pre-trained language learning models.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
presenting, to a client device associated with a user of a communication platform, a user interface (UI) comprising a prompt for the user to submit one or more alert phrases, each alert phrase being associated with a category;
receiving, from the client device, a list of submitted alert phrases;
receiving a transcript of a communication session between a plurality of participants, one of the participants being the user, the transcript comprising timestamps for a plurality of utterances associated with speaking participants;
for each utterance in the transcript, determining, at least in part via a prototypical neural network (ProtoNet), whether one or more predictions of relatedness are present between the utterance and one or more alert phrases from the list of submitted alert phrases; and
transmitting, to the client device, a list of related categories, each related category comprising one or more timestamps of utterances for which a prediction of relatedness is present for an alert phrase associated with that category.

2. The method of claim 1, further comprising:
for each alert phrase for which a prediction of relatedness is determined to be present, determining a category associated with the alert phrase.

3. The method of claim 1, wherein the UI further comprises a prompt for the user to submit, for each of the submitted alert phrases, a category to be associated with the alert phrase.

4. The method of claim 3, wherein the submitted category is selected by the user from a list of prespecified categories.

5. The method of claim 3, wherein the submitted category is created by the user.

6. The method of claim 1, wherein the UI further comprises a prompt for the user to define at least one of the categories associated with the alert phrases.

7. The method of claim 1, wherein determining whether the predictions of relatedness are present further comprises determining whether one or more predictions of relatedness are present between the utterance and one or more variations on alert phrases from the list of submitted alert phrases.

8. The method of claim 1, wherein determining whether the predictions of relatedness are present is performed at least in part by one or more sentence embedding models.

9. The method of claim 1, wherein the list of related categories with timestamps of utterances is transmitted in real-time while the user is connected to the communication session.

10. The method of claim 1, further comprising:
generating, based on the submitted alert phrases, one or more additional alert phrases to be added to the list of submitted alert phrases, each of the additional alert phrases being associated with a category.

11. The method of claim 10, further comprising:
segmenting each of the categories into one or more of: a positive speaker intent, a negative speaker intent, and a neutral speaker intent,
wherein each of the additional alert phrases is generated based further on the segment for a category.

12. The method of claim 1, further comprising:
detecting that one of the alert phrases has been associated with a category that differs in intent from the alert phrase; and
associating the alert phrase with a different category.

13. The method of claim 1, further comprising:
detecting that one of the submitted alert phrases at least partially matches an existing alert phrase; and
executing a target action in response to the detection, the target action comprising one or more of: removing the alert phrase from the list of submitted phrases, prompting the user to submit a different alert phrase, and replacing the submitted alert phrase with a generated alert phrase.

14. A communication system comprising one or more processors configured to perform operations of:
presenting, to a client device associated with a user of a communication platform, a user interface (UI) comprising a prompt for the user to submit one or more alert phrases, each alert phrase being associated with a category;
receiving, from the client device, a list of submitted alert phrases;
receiving a transcript of a communication session between a plurality of participants, one of the participants being the user, the transcript comprising timestamps for a plurality of utterances associated with speaking participants;
for each utterance in the transcript, determining, at least in part via a prototypical neural network (ProtoNet), whether one or more predictions of relatedness are present between the utterance and one or more alert phrases from the list of submitted alert phrases; and
transmitting, to the client device, a list of related categories, each related category comprising one or more timestamps of utterances for which a prediction of relatedness is present for an alert phrase associated with that category.

15. The communication system of claim 14, wherein determining whether the predictions of relatedness are present is performed at least in part by one or more intent detection algorithms.

16. The communication system of claim 14, wherein determining whether the predictions of relatedness are present is performed at least in part using one or more of: few-shot detection techniques, and zero-shot detection techniques.

17. The communication system of claim 14, wherein the ProtoNet comprises presenting a new task with unseen inputs and unseen classes.

18. The communication system of claim 14, wherein the list of related categories with timestamps of utterances is transmitted in real-time while the user is connected to the communication session.

19. The communication system of claim 14, wherein determining whether the predictions of relatedness are present is performed at least in part by one or more pre-trained language learning models.

20. A non-transitory computer-readable medium comprising instructions, that when executed by one or more processors, causes the one or more processors to perform operations comprising:
- presenting, to a client device associated with a user of a communication platform, a user interface (UI) comprising a prompt for the user to submit one or more alert phrases, each alert phrase being associated with a category;
- receiving, from the client device, a list of submitted alert phrases;
- receiving a transcript of a communication session between a plurality of participants, one of the participants being the user, the transcript comprising timestamps for a plurality of utterances associated with speaking participants;
- for each utterance in the transcript, determining, at least in part via a prototypical neural network (ProtoNet), whether one or more predictions of relatedness are present between the utterance and one or more alert phrases from the list of submitted alert phrases; and
- transmitting, to the client device, a list of related categories, each related category comprising one or more timestamps of utterances for which a prediction of relatedness is present for an alert phrase associated with that category.

* * * * *